Patented Sept. 1, 1931

1,821,375

UNITED STATES PATENT OFFICE

YVON BRANCART, OF RONQUIERES, BELGIUM

PROCESS OF TREATING GLASS

No Drawing. Application filed April 12, 1930, Serial No. 443,921, and in Belgium April 20, 1929.

The object of the present invention is to provide a process whereby, without blowing any gas, an insulating gaseous cushion may be easily produced between a glass sheet and a surface whereon said sheet has to travel or to rest during the rolling, casting or stretching thereof, in order that the glass shall not stick to said surface or cool too quickly at its contact. According to this process, the insulating cushion is produced by means of the gases evolved from a suitable combustible material adapted to be burned or charred by the heat of the glowing glass, without however coming into contact therewith so that any injurious contact between the glass and charred particles is avoided. To this end a perforated receiving surface is utilized and the combustible material is applied or fed to the under side of said surface, under such conditions that on its being brought to a high temperature by the glass the said material is ignited and the burning gases are caused to flow through the perforations and spread under the glass, thus forming a gaseous cushion in ignition which supports the glass while at the same time imparting thereto a desirable fire polish finishing.

As suitable fuels for carrying out this process, liquids as well as solid may be used, but I preferably employ fuels which on burning or charring do not give off any products capable of soiling the glass.

By way of example, as a liquid fuel, rectified petrol may be mentioned, and as solid fuels, pulverized charcoal and retort carbon. These may either be used in the dry state or mixed with a liquid so as to form a paste which is then applied under the surfaces whereon a gaseous cushion is to be produced. Sawdust, especially from poplar wood, also suits this purpose.

It may be advantageous in some cases, when the perforated receiving surface is a part of a hollow body, such as a hollow guide table for rolling trains, to place the fuel inside the hollow body combustion air being supplied if desired, so that the gases given off under the action of the hot glass will escape under pressure through the perforations, and form a gaseous cushion between the perforated surface and the glass sheet.

Alternately, a hollow rod provided with perforations may be used wherein the fuel material has been previously placed, the gases evolved from the fuel escaping through said perforations, as said rod is being passed between the glass and the receiving table.

It will be understood that the invention is not limited to these constructional forms, or to the particular materials mentioned hereinbefore by way of example.

I claim:

1. A process of treating rolled sheet or plate glass consisting of coating the under side of a perforated surface with a combustible material, feeding glass at glowing temperature over said surface, causing said material to be ignited by the glowing glass and, causing the ignited gases given off by said material to flow through the perforations in said surface, thus producing between said surface and the glass a gaseous cushion by the combustion of said material.

2. A process of treating rolled sheet or plate glass consisting in coating the inside of a hollow perforated body with a combustible material, feeding glass at glowing temperature over said body, causing said material to be ignited by the glowing glass, feeding combustion air into said body, causing the ignited gases given off by said material to flow through the perforations in said body, and keeping up a relative motion between the glass and said body during the combustion of said material.

In testimony whereof I affix my signature.

YVON BRANCART.